US006576145B2

United States Patent
Conaway et al.

(10) Patent No.: US 6,576,145 B2
(45) Date of Patent: Jun. 10, 2003

(54) METHOD OF SEPARATING HYDROCARBONS FROM MINERAL SUBSTRATES

(75) Inventors: Lawrence M. Conaway, Niagara Falls, NY (US); Roger Noble, Tulsa, OK (US); Michael Keller, Tulsa, OK (US); David Caffey, Bixby, OK (US)

(73) Assignee: Continuum Environmental, LLC, Niagara Falls, NY (US)

( * ) Notice: Subject to any disclaimer, the term of this patent is extended or adjusted under 35 U.S.C. 154(b) by 0 days.

(21) Appl. No.: 09/883,718

(22) Filed: Jun. 18, 2001

(65) Prior Publication Data

US 2002/0003115 A1 Jan. 10, 2002

Related U.S. Application Data

(63) Continuation-in-part of application No. 09/451,293, filed on Nov. 30, 1999, now Pat. No. 6,251,290, which is a continuation-in-part of application No. 09/304,377, filed on May 4, 1999, now Pat. No. 6,096,227, which is a continuation-in-part of application No. 08/971,514, filed on Nov. 17, 1997, now Pat. No. 5,928,522, which is a continuation-in-part of application No. 08/807,643, filed on Feb. 27, 1997, now Pat. No. 5,797,701.

(51) Int. Cl.[7] .............................. C02F 1/72; B09C 1/08
(52) U.S. Cl. ...................... 210/759; 210/766; 210/768; 210/774; 210/805; 210/808
(58) Field of Search ................................. 210/702, 759, 210/766, 768, 774, 805, 806, 808

(56) References Cited

U.S. PATENT DOCUMENTS

| 4,230,571 A | 10/1980 | Dadd |
| 4,416,786 A | 11/1983 | Knorre et al. |
| 4,504,445 A | 3/1985 | Walz |
| 4,591,443 A | 5/1986 | Brown et al. |
| 4,927,293 A | 5/1990 | Campbell |
| 5,259,962 A | 11/1993 | Later |
| 5,797,701 A | * 8/1998 | Conaway ..................... 210/759 |
| 5,928,522 A | * 7/1999 | Conaway ..................... 210/759 |
| 6,096,227 A | * 8/2000 | Conaway ..................... 210/759 |
| 6,251,290 B1 | * 6/2001 | Conaway ..................... 210/759 |

FOREIGN PATENT DOCUMENTS

| CA | 2177018 | * 11/1997 |
| WO | WO 95/30627 | * 11/1995 |

* cited by examiner

*Primary Examiner*—David A. Reifsnyder
(74) *Attorney, Agent, or Firm*—Neal L. Slifkin; Harris Beach LLP

(57) ABSTRACT

Method and apparatus for treating a mixture of mineral substrate particles and hydrocarbon compounds, especially tar sands and contaminated soils, to recover a hydrocarbon portion and a cleaned substrate portion. In a preferably continuous process, hydrocarbonaceous rock, sand, ore, or soil containing bitumen, petroleum, and/or kerogen is crushed or otherwise comminuted as needed to the particle size of sand or smaller. The comminuted ore is mixed with water to form a slurry, is heated to between 60° C. and 100° C., and is blended with an oxidant in aqueous solution, preferably hydrogen peroxide. Both free interstitial hydrocarbons and those hydrocarbons bound electrostatically to the surfaces of clay-like particles in the ore are released from the mineral substrate.

5 Claims, 3 Drawing Sheets

METHOD OF SEPARATING HYDROCARBONS FROM MINERAL SUBSTRATES

RELATIONSHIP TO OTHER PATENTS AND APPLICATIONS

The present application is a Continuation-in-part of my allowed application, Ser. No. 09/451,293 filed Nov. 30, 1999, now matured as U.S. Pat. No. 6,251,290, which is a Continuation-in-part of my application, Ser. No. 09/304,377 filed May 4, 1999, now matured as U.S. Pat. No. 6,096,227, which is a Continuation-in-part of my application, Ser. No. 08/971,514 filed Nov. 17, 1997, now matured as U.S. Pat. No. 5,928,522 issued Jul. 27, 1999, which is a Continuation-in-part of my application, Ser. No. 08/807,643 filed Feb. 27, 1997, now matured as U.S. Pat. No. 5,797,701 issued Aug. 25, 1998; the relevant disclosures of all of which being herein incorporated by reference.

DESCRIPTION

The present invention relates to methods and apparatus for recovering useful liquid and gaseous hydrocarbons from both naturally-occurring and man-made mixtures of hydrocarbons and mineral substrates; and more particularly to methods and apparatus for processing hydrocarbon-containing geologic materials, including tar sands, oil sands, oil sandstones, oil shales, and petroleum-contaminated soils, to recover petroleum-like hydrocarbons, and especially crude oil, therefrom and to render the mineral substrate residues suitably low in hydrocrbons, acids, and bases for environmentally-acceptable disposal.

As used herein, hydrocarbonaceous deposit is to be taken to include tar sands, oil sands, oil sandstones, oil shales, and all other naturally-occurring geologic materials having hydrocarbons contained within a generally porous rock-like inorganic matrix. The matrix may be loose, friable, or indurate. Contaminated soil is to be taken to include soils which have been impregnated with hydrocarbons, as is known to occur in petroleum drilling, well operating, storage, refining, transport, and dispensing processes.

Tar sands are naturally-occurring geological formations found in, for example, Canada (Alberta). Such sands have potential for yielding large amounts of petroleum. Tar sands are porous, generally loose or friable, and typically contain substantial amounts of clay and have the interstices filled with high-viscosity hydrocarbons known generally in the art as bitumen. Most of these tar-like bituminous materials are residues remaining after lighter (lower molecular weight) hydrocarbons have escaped or have been degraded through the action of microorganisms, water washing, and possibly inorganic oxidation. Very extensive tar sand deposits occur in northern Alberta along the Athabaska River and elsewhere. Tar sand layers in this area may be more than 60 meters thick and lie near the surface over a total area of about 86,000 $km^2$. They are estimated to contain a potential yield in excess of 1.6 trillion barrels of oil.

Oil shales are related to oil sands and tar sands; however, the substrate is a fine-grained laminated sedimentary rock typically containing an oil-yielding class of organic compounds known as kerogen. Oil shale occurs in many places around the world. Particularly kerogen-rich shales occur in the United States, in Wyoming, Colorado, and Utah, and are estimated to contain in excess of 540 billion potential barrels of oil.

Hydrocarbons recoverable from tar sands and oil shales may comprise, but are not limited to, bitumen, kerogen, asphaltenes, paraffins, alkanes, aromatics, olefins, naphthalenes, and xylenes.

In the known art of petroleum recovery from hydrocarbonaceous deposits, the high molecular weight bituminous or kerogenic material may be driven out of the sands, sandstones, or shales with heat. For example, in a known process for recovering kerogen from oil shale, crushed shale is heated to about 480° C. to distill off the kerogen which is then hydrogenated to yield a substance closely resembling crude oil. Such a process is highly energy intensive, requiring a portion of the process output to be used for firing the retort, and thus is relatively inefficient. Also, a significant percentage of the kerogen may not be recovered, leaving the process tailings undesirable for landfill.

Another process, as disclosed in Canadian Patent Application No. CA 2177018, filed May 21, 1996 and laid open Nov. 22, 1997, requires the use of hydrogen peroxide to separate an aqueous slurry of tar sand into an upper froth layer, a middle clean water layer, and a lower clean sand layer. Released bitumen is contained in the froth layer which is recovered by decanting of the batch-process vessel. (The disclosure incorrectly refers to, and claims, hydrogen peroxide as a catalyst; the hydrogen peroxide is not a catalyst but is an oxidizing reagent which is consumed in the process.)

The disclosed process has at least two shortcomings. First, it is configured specifically as a batch method and provides no guidance in either hardware or process steps toward making it continuous, as would be highly advantageous for processing very large volumes of ore on a sustained basis. Second, it recovers bitumen from tar sand in substantially unchanged form and molecular weight.

Other known processes, for recovering bitumen from tar sands for example, require the use of caustic hot water or steam. For example, a process currently in use in Canada requires that a hot aqueous slurry of tar sand be mixed with high concentrations of aqueous caustic soda to fractionate the bitumen into lower molecular weight hydrocarbons which may then be separated from the mineral residues and refined further like crude oil. This process has several serious shortcomings. First, it is relatively inefficient, typically recovering less than about 70% of the hydrocarbons contained in the sands. "Free" hydrocarbons, that is, compounds mechanically or physically contained interstitially in the rock, may be recovered by this process; but "bound" hydrocarbons, that is, compounds electrostatically bound by non-valence charges to the surface of clays or other fines having high electronegative surface energy, are not readily released by some prior art process. In fact, high levels of caustic may actually act to inhibit the desired release of organic compounds from such surfaces and may tend to emulsify released bitumen with water, making later separation very difficult. Thus, the prior art process is wasteful in failing to recover a substantial portion of the hydrocarbon potential, and the mineral substrate residue of the process may contain substantial residual hydrocarbon, making it environmentally unacceptable for landfill. Typically, the aqueous tailings of prior art processes require ponding, sometimes for years, to permit separation of water from the suspended and entrained particles. The volumes and surface areas of such ponds in Alberta are enormous.

Second, the wet sand and clay residues can be caustic and may not be spread on the land or impounded in lagoons without extensive and expensive neutralization.

Third, the caustic aqueous residual may contain high levels of dissolved petroleum, which is non-recoverable and also toxic in landfill. Such residual also has a high Chemical Oxygen Demand (COD), making ponds containing such residual substantially anoxic and incapable of supporting plant or animal life and highly dangerous to waterfowl.

Fourth, oils recovered by the prior art process typically have high levels of entrained or suspended fine particulates which must be separated as by gravitational settling, filtration, or centrifugation before the oils may be presented for refining. These particulates may be emulsified with the oils and can be extremely difficult to separate out.

Fifth, the present-day cost of oil recovered from Albertan tar sands by prior art process may require a substantial governmental subsidy to match the world spot price of crude oil.

It is a principal object of the invention to provide an improved process for recovering hydrocarbons from hydrocarbonaceous deposits in greater than 90% yield.

It is a further object of the invention to provide an improved process for recovering hydrocarbons from hydrocarbonaceous deposits in greater than 99% yield.

It is a still further object of the invention to provide an improved recovery process which provides a substrate residue which is acceptable under applicable environmental guidelines for landfill disposal.

It is a still further object of the invention to provide an improved recovery process which can recover both free and bound hydrocarbon compounds from particulate mineral substrates and thereby recover a high percentage of all of the hydrocarbons therein.

It is a still further object of the invention to provide an improved recovery process which is substantially less expensive to operate on a per-unit of ore basis than are known treatment processes.

It is a still further object of the invention to provide an improved recovery process which can yield a refinable oil product at a unit cost competitive with that of crude oil produced conventionally from wells.

Briefly described, a hydrocarbonaceous ore mixture typically containing bitumen and/or kerogen and a mineral substrate is crushed or otherwise comminuted as needed to the consistency of wet sand. The ore may be screened to eliminate rocks or plant materials from the soil overburden of the ore deposit. The comminuted ore is mixed with water to form a slurry, preferably is heated to between about 20° C. and about 100° C., and is blended with an oxidant in aqueous solution, preferably hydrogen peroxide. The water may include fresh water, salt water, seawater, tailing pond water, recycled process water, and combinations thereof. The slurry is strongly agitated for between 5 and 60 minutes. Both free interstitial hydrocarbons and those hydrocarbons bound electrostatically to the surfaces of clay-like particles are released from the mineral substrate, possibly by an electrophysical reaction in the presence of the oxidant. A portion of the released bituminous and kerogenic compounds may be lysed by the oxidant in a controlled Fenton's reaction to yield organic compounds having lowered molecular weights. Separation from the process water phase and the residual mineral phase may be enhanced by addition of flocculants to the slurry and by sparging of the slurry with microbubbles of gas. The water and rock tailings from the process are substantially free of hydrocarbon contamination and are environmentally suitable for disposal. In a preferred embodiment, the oxidant is divided and is added to the slurry at a plurality of points and times during agitation.

In a further preferred embodiment, the only wastewater from the process is the water contained in the wet tailings of sand and clay. The remainder of the separated water is recycled into the mixing stage at the head end of the process.

The foregoing and other objects, features, and advantages of the invention, as well as presently preferred embodiments thereof, will become more apparent from a reading of the following description in connection with the accompanying drawings, in which.

Figure 1:
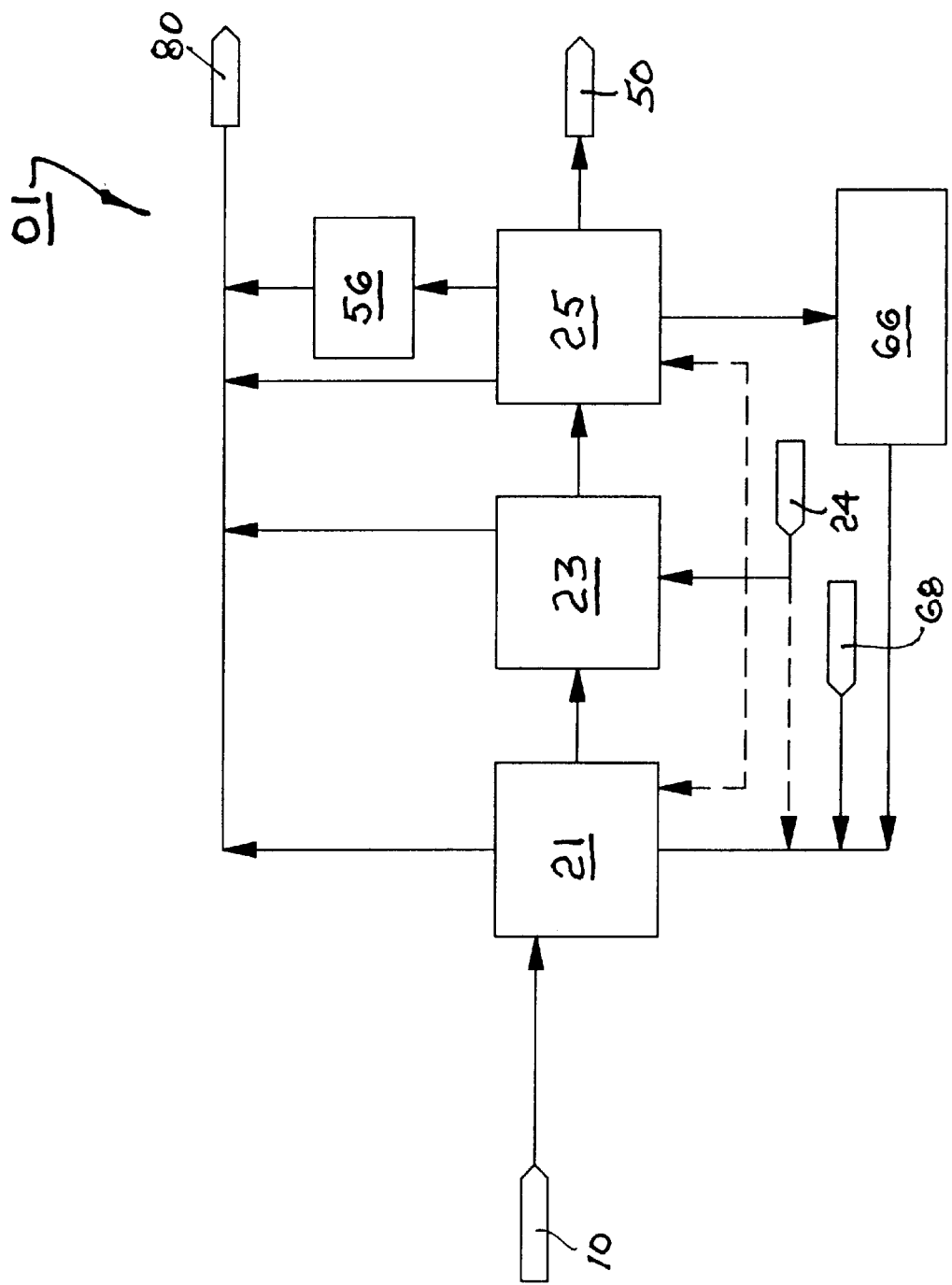
FIG. 1 is a simplified schematic flowpath of a continuous process for recovering hydrocarbons from hydrocarbonaceous ores or soils in accordance with the invention.

Since ore volumes to be treated can be relatively large, it is preferable to configure the process for continuous throughput, although semi-continuous and batch systems are within the scope of the invention and all such processes may be configured of conventional apparatus without undue experimentation or further invention.

The oxidative stripping processes, for remediation of hydrocarbon-contaminated soils as disclosed in U.S. Pat. No. 5,797,701, and for treatment of oil refinery wastes as disclosed in my U.S. Pat. No. 5,928,522, and for treatment of industrial sludges as disclosed in my U.S. patent application, Ser. No. 09/304,377 filed May 4, 1999 now U.S. Pat. No. 6,096,227 and for recovering hydrocarbons from tar sands and oil shales as disclosed in my allowed U.S. patent application, Ser. No. 09/451,293 now U.S. Pat. No. 6,251,290 are readily adaptable as described herein to the treatment of mixtures of hydrocarbons and particulate mineral substrates to recover a high percentage of the hydrocarbon content therefrom.

DETAILED DESCRIPTION OF THE INVENTION

Referring to FIGS. 1 through 4, in a hydrocarbon recovery process and apparatus 01 embodying the invention, a hydrocarbon/substrate mixture 10, referred to generally herein as hydrocarbonaceous ore, which has been mined, crushed, ground, screened, or otherwise pre-treated as needed in a preparation zone to eliminate large rocks and debris, for example, by a rotary trommel screen, and to yield a feedstock having particles preferably less than about 2 mm in diameter (sand and clay size), is charged through a feeder 11, for example, a screw extruder, into a mixing zone 21, for example, mixing tank 12, wherein it is mixed with water to form a pumpable slurry 13 having a weight percent proportion of ore to water of between about 0.5:1 and about 2:1. The slurry is agitated by mixer 17 and its temperature is adjusted to between about 20° C. and about 100° C. to begin to release free hydrocarbons from the mineral substrate, soften waxy or ashpaltic hydrocarbon solids, reduce the apparent viscosity of the batch, reduce the density of hydrocarbon fractions within the batch and begin to break surface adhesion of hydrocarbon compounds bound to substrate surfaces. Preferably, the temperature is adjusted to about 80° C. As is known in the prior art, a "cutter stock" such as diesel oil, kerosene, or naphtha, may be added to the slurry at this point in the process, or later, as described below, to help dissolve and dilute the hydrocarbons and to lower the density and viscosity thereof to assist in separation from the aqueous phase later in the process.

Figure 2:
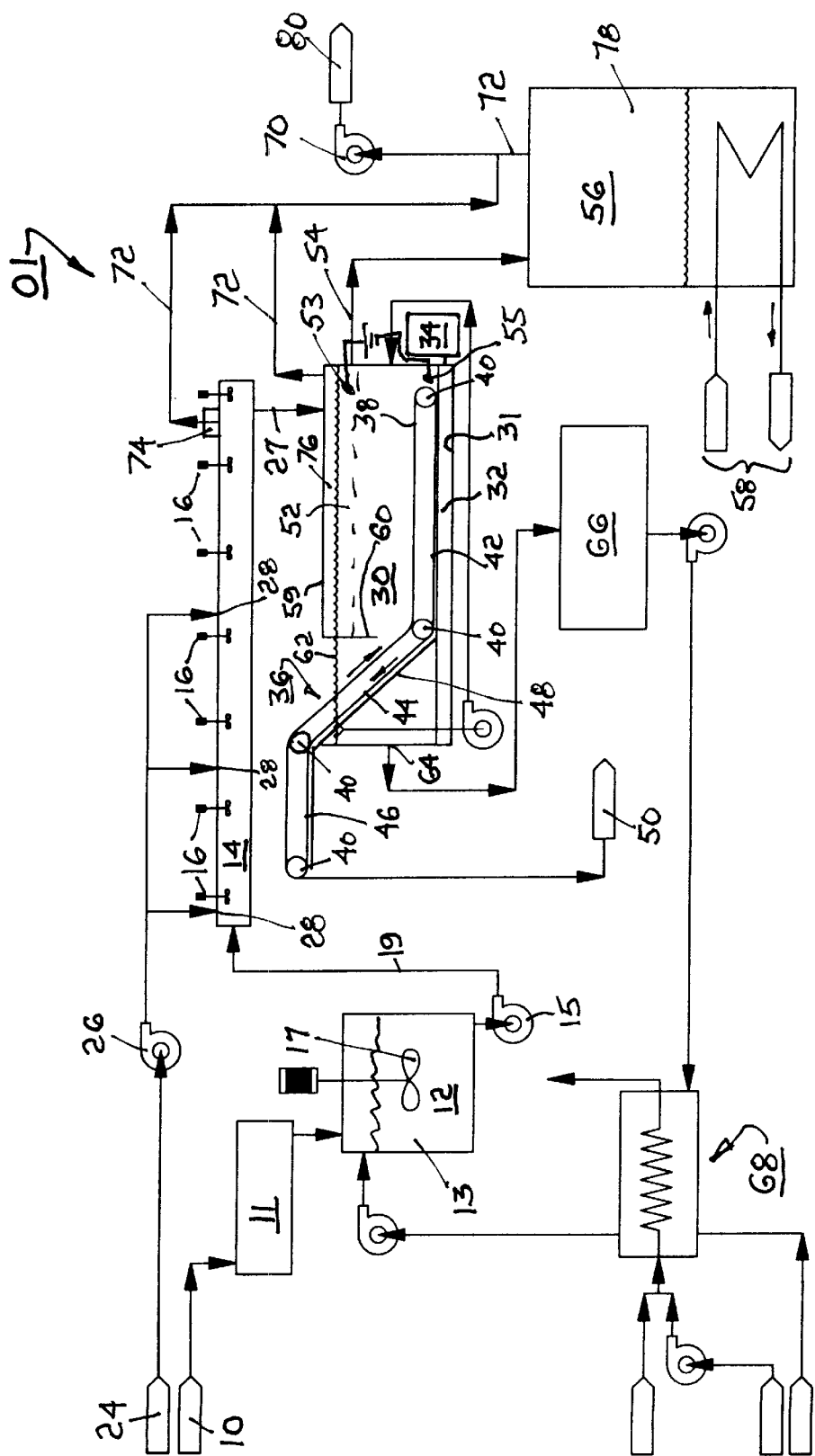
FIG. 2 is a more detailed schematic flowpath of the basic process shown in FIG. 1.
Figure 3:
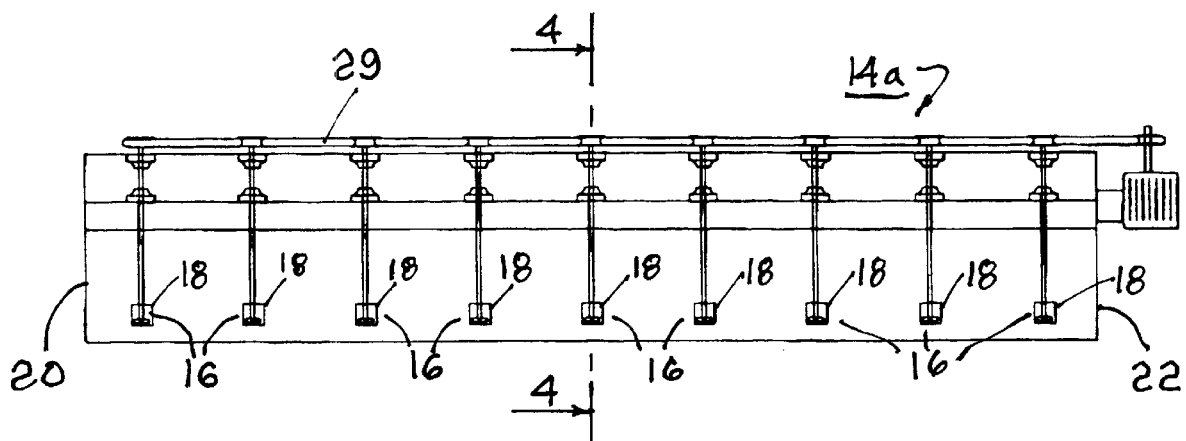
FIG. 3 is a more detailed view of a modular oxidizing vessel.
Figure 4:
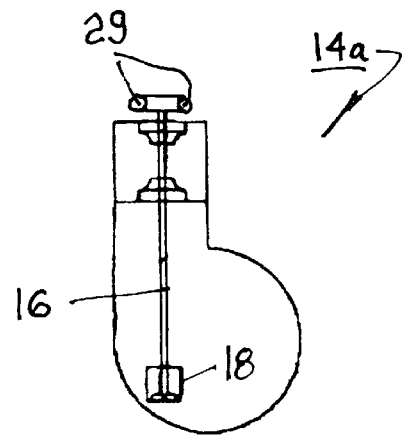
FIG. 4 is an elevational cross-sectional view taken along line 4—4 in FIG. 3.

Mixing zone 21 is in communication with a subsequent oxidizing zone 23. For example, connected to mixing tank 12 is an oxidizing vessel 14 into which slurry 13 is preferably pumped by a first transfer pump 15 via line 19. Slurry 13 may also be transferred by gravity feed, and tank 12 and vessel 14 may be configured as different parts of a single vessel (not shown), within the scope of the invention. Vessel 14 is preferably configured as a long tube, preferably disposed horizontally, having a cross-section in the shape of the letter P (see FIG. 4), such that a plurality of shrouded propeller mixers 16 may be readily installed into vessel 14 at a plurality of locations along the vessel (see FIGS. 2 and 3). The mixers may be individually driven as by electric motors or preferably are ganged together with a common drive as by a chain or belt 29 in known fashion, as shown in FIG. 3. Each mixer is preferably provided with a generally cylindrical shroud 18 to narrow the cone of flow turbulence emanating from the mixer. Each mixer is disposed non-radially of the tube and preferably generally tangentially thereof, and normal to a plane containing the axis of the tube, such that the slurry is violently rolled in a horizontal vortex as it passes along the tube from an entrance port 20 to an exit port 22. Preferably, vessel 14 and pump 15 are sized to provide an axial mass flowrate of slurry 13 along the tube of about 0.1 ft/sec, or about 6 ft/min, where the slurry is conditioned to 80° C. and the process is operated at atmospheric pressure. At other pressures, for example, up to 5 atmospheres gauge, and other temperatures, for example, up to 150° C., other suitable times are readily determinable by one of ordinary skill in the chemical engineering arts without undue experimentation.

In vessel 14, slurry 13 is blended with an aqueous solution containing an oxidizing reagent to produce a slurry having a level of oxidant equivalent to a hydrogen peroxide percentage between about 0.05% and about 10.0% in the water phase by weight. Various well known oxidants, for example, potassium permanganate peroxide salts such as sodium peroxide, atomic oxygen generators such as ozone, and even molecular oxygen itself can perform the oxidative function of the subject process, but hydrogen peroxide is the preferred oxidant. It is easily handled and stored as a solution and ultimately decomposes to water and oxygen, leaving no elemental or mineral residue in the tailings. The oxidizing solution is supplied from a storage source 24 through a feed pump 26 into vessel 14 via one or more ports 28 spaced along the length of vessel 14, as shown in FIG. 2. Preferably, the total flow of oxidizing solution is divided and supplied to a plurality of ports 28.

In the presence of the oxidant, the electrostatically bound hydrocarbons are released from the surface of substrate particles, especially very fine clay or clay-like particles, and are added to the free hydrocarbons previously released. Preferably, vessel 14 is a closed vessel such that there is no air/slurry interface and violent agitation by the mixers prevents the released hydrocarbons from separating out. The "bituminous froth" well known in prior art methods cannot form in this part of the present process because no air is allowed into vessel 14 as would be required for a froth to form.

Although the accuracy of a theory is not relied upon for patentability of the methods disclosed and claimed herein, it is currently believed by the inventor that the hydrocarbon molecules adhered to the rock substrate particles in the ore carry positive non-valence charges which bind them to negative surface charges on the particles, especially on clay-sized fines; and further, that the hot oxidant, in a mechanism not yet fully understood, tends to neutralize the non-valence charges on either or both of the hydrocarbon molecules and the particle surfaces, thereby releasing one from the other.

The hot oxidant functions further in a second way to oxidize allyl and other hydrocarbon moieties to lighter petroleum fractions via the well-known Fenton's Reaction. Hydrogen peroxide reacts with ubiquitous ferrous ions to produce an hydroxyl radical in an acidified aqueous medium.

$$H_2O_2 + Fe^{+2} \rightarrow \ddot{y}\ OH\cdot + OH{-} + Fe^{+3} \tag{Eq. 1}$$

The resultant hydroxyl free radicals (OH) are extremely powerful oxidizers that progressively react with organic compounds through a series of oxidation reactions. During the process, the oxidation reactions proceed by degrading the organic constituents (b) having long chain lengths (n carbon atoms) into a greater number of molecules (b+c) having less complex and shorter carbon chain lengths (n−α):

$$H_2O_2 + bC_nH_n \rightarrow H_2O + (b+c)C_{n-\alpha}H_n \tag{Eq. 2}$$

In an excess of oxidant, all organic carbon may be converted to $CO_2$ in accordance with Eq. 3 (not balanced):

$$H_2O_2 + C_nH_n \rightarrow H_2O + nCO_2 \tag{Eq. 3}$$

However, in a process in accordance with the invention, wherein reaction time, temperature, and the amount of oxidant are controlled by a programmable controller 17, Fenton's reaction is limited to breaking relatively few covalent bonds, sufficient only to reduce the average molecular weight of the bituminous or kerogenic hydrocarbons in the first and second residues to approximately that of conventional crude oil produced from a well.

Vessel 14 may be conveniently assembled from modular units like unit 14a shown in FIG. 3. For example, at an axial slurry flowrate of 0.1 ft/sec, a 10-foot module has a slurry residence time of 1.67 minutes. Thus, an assembly of ten such modules in sequence, overall 100 feet long, can accommodate a residence time of greater than 16 minutes.

Oxidizing zone 23 is in communication with a separation zone 25. For example, from exit port 22, the slurry is passed into a separator tank 30 via line 27. The larger sand-sized particles, substantially freed of hydrocarbons, settle out of the slurry to the bottom of the tank. For a continuous process, tank 30 is provided with a substantially flat bottom on which the layer of sand accumulates. The settling sand can mechanically trap globules of bitumen; therefore, in a preferred embodiment, a gas distribution means such as a sparger bar 32 is disposed within the tank on the bottom 31, where sand can settle upon it. A gas, such as compressed air, is delivered from a source 34 to sparger bar 32 and is allowed to bubble up through the settling sand in the form of microbubbles to sweep entrained bitumen up into the water/hydrocarbon phase. Such sparging may be performed continuously or intermittently, preferably at a sufficiently low gas flow rate that the settling sand is not significantly agitated back into the water phase.

Sand that accumulates on bottom 31 may be removed, within the scope of the invention, by any means desired. In a preferred embodiment, as shown in FIG. 2, a drag chain conveyor 36 is disposed in tank 30 in proximity to and above sparger bar 32. Conveyor 36 comprises a continuous articulated belt 38 of paddles or scoops hinged together and disposed around a plurality of rollers 40 driven by a conventional drive means (not shown) in a pathway having a first portion 42 substantially parallel to bottom 31, a second portion 44 leading upwards and away from bottom 31 and out of tank 30, and a third portion 46 leading away from tank 30. Return paths are parallel and opposite to the exit paths just described. The motion of the conveyor, as shown in FIG. 2, is clockwise. Sand settling to the bottom of the tank and being cleaned of bitumen by the sparger settles through spaces in the conveyor belt and accumulates to a depth at which first conveyor portion 42 is encountered. As cleaned sand continues to accumulate, conveyor 36 sweeps the sand to the left in tank 30 and then drags excess sand up the slope of exit chute 48 and away from tank 30 to a storage site 50. The sand thus separated is wet with water, is substantially free of hydrocarbons, and is environmentally suitable for direct landfill without further treatment.

In the liquid phase in separator 30, a froth 52 rich in hydrocarbons rises to the surface as the aqueous and organic phases partially separate gravitationally. The separation is enhanced by the bubbles rising from sparger 32. Froth 52 typically contains substantial amounts of entrained water and substrate fines. To remove most water and fines from the organic phase, the froth containing oxidized and non-oxidized bitumen and/or kerogen is mixed (if not previously so mixed in mixing tank 12 as described above), preferably at a ratio of about 1:1, with cutter stock, to dilute and solubilize the bitumen or kerogen, causing a further separation of the froth into an aqueous phase containing the fines and an organic phase containing the hydrocarbons.

Optionally, such separation may be effected by centrifugation, filtration, settling, adsorption, absorption, or combinations thereof, of one phase from the other, or of the liquids from the particulates.

Optionally, such separation may be further enhanced, as in a preferred embodiment, by mixing a flocculating agent into the slurry at the end of its passage through the oxidizing zone or as it enters the separation zone. Suitable flocculating agents include, but are not limited to, inorganic compounds, such as lime, gypsum, alum, and diatomaceous earth. Flocculated fines are allowed to settle to the tank bottom with the sand and are removed by conveyor 30.

Optionally, such separation may be enhanced and accelerated by passage of electric current through the liquid phase. In a currently preferred embodiment, direct current is passed from a positive electrode 53 in the tank near the top of the aqueous phase and a negative electrode 55 near the bottom of the aqueous phase. Separation is greatly accelerated by the application of about 11 volts DC at a current of about 180 milliamperes. Preferably, separator tank 30 is formed of, or lined with, a dielectric, for example, glass, to prevent short-circuiting of the imposed current through the walls of the tank.

Optionally, such separation may be enhanced by further addition of relatively small amounts of oxidant in the separation tank. As is disclosed in the incorporated U.S. Pat. No. 6,251,290, peroxide can assist dramatically in breaking colloidal suspensions of clay particles that are prone to form in water.

Optionally, such separation may be enhanced by further addition of water to the separator tank.

The organic phase floating on the aqueous phase near the top of tank 30 following separation therefrom preferably is drawn off via overflow pipe 54 and sent to a storage tank 56 where it is ready for shipment to a petroleum refiner. Bitumen and other hydrocarbonaceous products of the present process may be heated in tank 54 by a hot water or steam heater system 58 to reduce viscosity and promote flow as needed. The cutter stock may be recovered from the bitumen in known fashion by the refiner and returned for reuse.

Separator tank 30 is further provided with a partial cover 59 which includes along one edge an inverted weir 60 extending from above the surface 62 of the liquid phase downwards into the aqueous phase. The aqueous phase, still typically containing a dispersion of some portion of the clay fines, is drawn off from tank 30 via a middling outlet port 64 at a flowrate selected such that the organic phase is not drawn under weir 60. The aqueous phase is directed to a water conditioner 66 which may comprise any of various well-known clarifying devices, including but not limited to a centrifuge, a filter, and a tailings pond. Preferably, conditioner 66 is a sand filter, which may utilize the sand in storage site 50 or other sand medium. Particle-free process water suitable for re-use is recycled from conditioner 66 through water heater system 68 into mixing tank 12. It is an important feature of the invention that the only water necessarily residual of the process is the water wetting the sand and clay. In many applications, the process water exiting the conditioner 66 may be re-used in its entirety as make-up water in the initial mixing step.

The present process may also yield gaseous hydrocarbons which are desirably collected for at least environmental reasons, and which may be present in sufficient quantity to have economic significance. Accordingly, a vacuum pump 70 is connected via vacuum lines 72 to a headspace 74 in the oxidizing vessel, a headspace 76 beneath cover 59 of the separator tank, and a headspace 78 in storage tank 56. The collected vapors 80 may be burned off to the atmosphere or may be directed for combustion in water heating system 68 or may be otherwise used.

From the foregoing description it will be apparent that there has been provided improved methods and apparatus for economically recovering petroleum-like hydrocarbon residues from particulate mineral substrates, especially hydrocarbonaceous geological deposits, and for discharging a substrate residue environmentally suitable for landfill disposal. Variations and modifications of the herein described methods and apparatus, in accordance with the invention, will undoubtedly suggest themselves to those skilled in this art. Accordingly, the foregoing description should be taken as illustrative and not in a limiting sense.

What is claimed is:

1. A method for separating hydrocarbons from a mixture of hydrocarbons and a particulate mineral substrate, comprising the steps of:
   a) feeding a predetermined amount of said mixture into a mixing vessel;
   b) adding a predetermined amount of water to said mixture;
   c) mixing said water and said mixture together to form an aqueous slurry;
   d) tempering said slurry to a temperature between about 20° C. and about 150° C.;
   e) passing said tempered slurry from said mixing vessel through a linear oxidation vessel at a low axial flow velocity and a high radial and rotational flow velocity to release said hydrocarbons from said mineral substrate and to reduce the molecular weight of at least a portion of said hydrocarbons, the residence time of said slurry in said oxidation vessel being between about 5 minutes and about 60 minutes; and
   f) passing said tempered slurry from said linear oxidation vessel through a separator wherein at least a portion of said particulate mineral substrate is separated from said water and said hydrocarbons, and wherein at least a portion of said hydrocarbons are separated from said water.

2. A method in accordance with claim 1 further comprising the step of treating the water separated in step f).

3. A method in accordance with claim 1 further comprising the step of recycling at least a portion of said separated water into said adding step.

4. A method in accordance with claim 1 wherein at least a portion of said method is carried out at a gauge pressure of about one atmosphere.

5. A method in accordance with claim 1 wherein at least a portion of said method is carried out at a gauge pressure between about one atmosphere and about five atmospheres.

* * * * *